(12) United States Patent
Sun

(10) Patent No.: US 12,336,503 B1
(45) Date of Patent: Jun. 24, 2025

(54) PET GARMENT

(71) Applicant: Tingting Sun, Sichuan (CN)

(72) Inventor: Tingting Sun, Sichuan (CN)

( * ) Notice: Subject to any disclaimer, the term of this patent is extended or adjusted under 35 U.S.C. 154(b) by 0 days.

(21) Appl. No.: 19/012,270

(22) Filed: Jan. 7, 2025

(51) Int. Cl.
*A01K 13/00* (2006.01)

(52) U.S. Cl.
CPC .................................. *A01K 13/006* (2013.01)

(58) Field of Classification Search
CPC .. A01K 13/006; A01K 27/002; A01K 13/007; A01K 13/008
See application file for complete search history.

(56) References Cited

U.S. PATENT DOCUMENTS

| | | | | |
|---|---|---|---|---|
| 6,123,049 A * | 9/2000 | Slater | ................... | A01K 27/002 54/79.2 |
| 7,343,881 B2 * | 3/2008 | Schantz | ............... | A01K 27/002 119/856 |
| 11,617,350 B1 * | 4/2023 | Valentine | ............. | A01K 13/006 119/850 |
| 2006/0156997 A1 * | 7/2006 | Moore | ................. | A01K 1/0263 119/792 |
| 2008/0276880 A1 * | 11/2008 | Swisher | ............... | A01K 27/002 119/728 |
| 2010/0199507 A1 * | 8/2010 | Gonzalez | ............... | A01K 29/00 33/511 |
| 2010/0199927 A1 * | 8/2010 | Cigard | ................. | A01K 27/002 119/850 |
| 2013/0160720 A1 * | 6/2013 | Corcoran | ............. | A01K 13/006 119/174 |
| 2018/0242549 A1 * | 8/2018 | Zimmerman | ........ | A01K 1/0263 |
| 2021/0153458 A1 * | 5/2021 | Pan | ...................... | A01K 13/006 |
| 2023/0036154 A1 * | 2/2023 | Zimmerman | ........ | A01K 1/0263 |
| 2023/0263138 A1 * | 8/2023 | Stevens | ............... | A01K 27/002 119/792 |

* cited by examiner

*Primary Examiner* — Trinh T Nguyen
(74) *Attorney, Agent, or Firm* — Daniel M. Cohn

(57) ABSTRACT

A pet garment is provided, including a garment main body and a strap assembly. The garment main body includes a top portion, a bottom portion, a first side, and a second side. The strap assembly includes a first strap, a second strap, and a connecting strap. A first end of the first strap and a first end of the second strap are both disposed at the first side of the garment main body. The connecting strap is configured to connect a second end of the first strap and a second end of the second strap into a unit. A connecting component is disposed on the connecting strap, and the connecting component is configured to connect to a pet leash. The pet garment enables better usability.

19 Claims, 6 Drawing Sheets

PET GARMENT

TECHNICAL FIELD

The present disclosure relates to the field of pet supplies, and in particular to a pet garment.

BACKGROUND

Growth of the pet market leads to a diversification of pet supplies, offering a wealth of options, such as pet garments, dog leashes, and pet toys, and there is an increasing focus on meeting humanized needs in pet care. In the prior art, the pet garments each typically includes a garment main body and straps. Each garment main body is provided for pets to wear, while each strap is provided to cooperate with the garment main body to restrain the pets and is also configured to connect to a corresponding pet leash. However, in current pet garments, corresponding straps are generally positioned around a neck area of the garment main body; when the pets wear the current pet garments, the current pet garments often fail to provide effective restraint; particularly when the pets are in an excited or highly active state, achieving effective control becomes even harder.

SUMMARY

In order to overcome defects in the prior art, the present disclosure provides a pet garment.

Technical solutions adopted by the present disclosure are as follows.

The present disclosure provides the pet garment, including a garment main body and a strap assembly. The garment main body includes a top portion, a bottom portion, a first side, and a second side. The strap assembly includes a first strap, a second strap, and a connecting strap. A first end of the first strap and a first end of the second strap are both disposed at the first side of the garment main body. The connecting strap is configured to connect a second end of the first strap and a second end of the second strap into a unit. The second end of the first strap and the second end of the second strap, along with the connecting strap, are routed around the bottom portion of the garment main body, over the second side of the garment main body, and up to the top portion of the garment main body to position the connecting strap on the top portion of the garment main body, the second end of the first strap is detachably connected to the first end of the first strap at the first side of the garment main body, the second end of the second strap is detachably connected to the first end of the second strap at the first side of the garment main body. A connecting component is disposed on the connecting strap, and the connecting component is configured to connect to a pet leash.

Furthermore, a first end of the connecting strap is connected to the first strap, the first end of the connecting strap is connected to the first strap at a point close to the second end of the first strap, a second end of the connecting trap is connected to the second strap, the second end of the connecting strap is connected to the second strap at a point close to the second end of the second strap, so as to connect the second end of the first strap and the second end of the second strap into the unit.

Furthermore, the first end of the connecting strap is configured to slide along the first strap at the top portion of the garment main body, so as to adjustably connect the first end of the connecting strap to the first strap.

Furthermore, the connecting strap includes a first limiting sleeve hole at the first end thereof, the first limiting sleeve hole is sleeved on the first strap to allow the first end of the connecting strap to slide along the first strap at the top portion of the garment main body.

Furthermore, a first limiting component is disposed at a first side of the first limiting sleeve hole, a second limiting component is disposed at a second side of the first limiting sleeve hole, the first limiting component and the second limiting component are configured to limit a travel range of the first end of the connecting strap as the first end of the connecting strap slides along the first strap.

Furthermore, the first limiting component is a first adjusting buckle, the first adjusting buckle is disposed on the first strap to adjust a length of the first strap.

Furthermore, the second limiting component is disposed at the second end of the first strap, the second limiting component is a first closure component, a second closure component is disposed at the first end of the first strap, the first closure component and the second closure component are detachably connected to detachably connect the second end of the first strap and the first end of the first strap.

Furthermore, the connecting strap and the first strap are both made of fabric.

Furthermore, the second end of the connecting strap is configured to slide along the second strap at the top portion of the garment main body, so as to adjustably connect the second end of the connecting strap to the second strap.

Furthermore, the connecting strap includes a second limiting sleeve hole at the second end thereof, the second limiting sleeve hole is sleeved on the second strap to allow the second end of the connecting strap to slide along the second strap at the top portion of the garment main body.

Furthermore, a third limiting component is disposed at a first side of the second limiting sleeve hole, a fourth limiting component is disposed at a second side of the second limiting sleeve hole, the third limiting component and the fourth limiting component are configured to limit a travel range of the second end of the connecting strap as the second end of the connecting strap slides along the second strap.

Furthermore, the third limiting component is a second adjusting buckle, the second adjusting buckle is disposed on the second strap to adjust a length of the second strap.

Furthermore, the fourth limiting component is disposed at the second end of the second strap, the fourth limiting component is a third closure component, a fourth closure component is disposed at the first end of the second strap, the third closure component and the fourth closure component are detachably connected to detachably connect the second end of the second strap and the first end of the second strap.

Furthermore, the connecting strap and the second strap are both made of fabric.

Furthermore, the garment main body includes a first covering portion and a second covering portion. The first covering portion is configured to encircle and cover a neck of a pet, the first end of the first strap is disposed at a first side of the first covering portion, the second end of the first strap is routed around a bottom portion of the first covering portion, over a second side of the first covering portion, up to a top portion of the first covering portion, and is detachably connected to the first end of the first strap at the first side of the first covering portion. The second covering portion is configured to encircle and cover a chest portion of the pet, the first end of the second strap is disposed at a first side of the second covering portion, the second end of the second strap is routed around a bottom portion of the second covering portion, over a second side of the second covering portion, up to a top portion of the second covering portion, and is detachably connected to the first end of the second strap at the first side of the second covering portion.

Furthermore, a first channel is disposed along the bottom portion of the first covering portion, extending between the first side of the first covering portion and the second side of the first covering portion, the first strap passes through the first channel, so as to be attached to the first covering portion. A second channel is disposed along the bottom portion of the second covering portion, extending between the first side of the second covering portion and the second side of the second covering portion, the second strap passes through the second channel, so as to be attached to the second covering portion.

Furthermore, the garment main body defines foreleg holes on the bottom portion thereof, the foreleg holes are defined between the first covering portion and the second covering portion for front legs of the pet to pass through.

Furthermore, the garment main body includes a zipper on the top portion thereof, so as to detachably connect the first side of the garment main body and the second side of the garment main body at the top portion of the garment main body.

Furthermore, the first covering portion includes an adjustable cord, locking components are respectively disposed at both ends of the adjustable cord.

Furthermore, the bottom portion of the garment main body does not cover an abdomen of the pet.

Beneficial effects of the present disclosure are as following.

According to the pet garment of the present disclosure, when in use, the garment main body is worn on the pet. Since the second end of the first strap and the second end of the second strap, along with the connecting strap, are routed around the bottom portion of the garment main body, over the second side of the garment main body, and up to the top portion of the garment main body, the second end of the first strap is detachably connected to the first end of the first strap at the first side of the garment main body, and the second end of the second strap is detachably connected to the first end of the second strap at the first side of the garment main body, the first strap and the second strap form a restraint around the garment main body. The connecting strap is configured to connect the second end of the first strap and the second end of the second strap into the unit, that is, the first strap and the second strap form a unified restraining assembly. Interaction between the first strap and the second strap creates a coordinated restraining effect, thereby significantly enhancing restraint performance of the pet garment of the present disclosure and further rendering an overall structure of the pet garment more reliable and compact. Additionally, since the connecting strap is positioned at the top portion of the garment main body and the connecting component is disposed on the connecting strap, a function of guiding and walking the pet is enabled through connecting the connecting component to the pet leash.

Furthermore, when the pet garment is to be removed from the pet, the second end of the first strap needs to be detached from the first end of the first strap, and the second end of the second strap needs to be detached from the first end of the second strap. Moreover, after detaching, the connecting strap is capable of connecting the first strap and the second strap, which simplifies storage of the first strap and the second strap and preparation for future use.

BRIEF DESCRIPTION OF DRAWINGS

In order to more clearly illustrate technical solutions in embodiments of the present disclosure, accompanying drawings required in description of the embodiments are briefly described below, and the accompanying drawings in the following description are merely some embodiments of the present disclosure, and for those who skilled in the art, other drawings may be obtained according to these accompanying drawings without creative efforts.

The present disclosure is further described below with reference to the accompanying drawings and the embodiments.

DETAILED DESCRIPTION OF EMBODIMENTS

Figure 1:
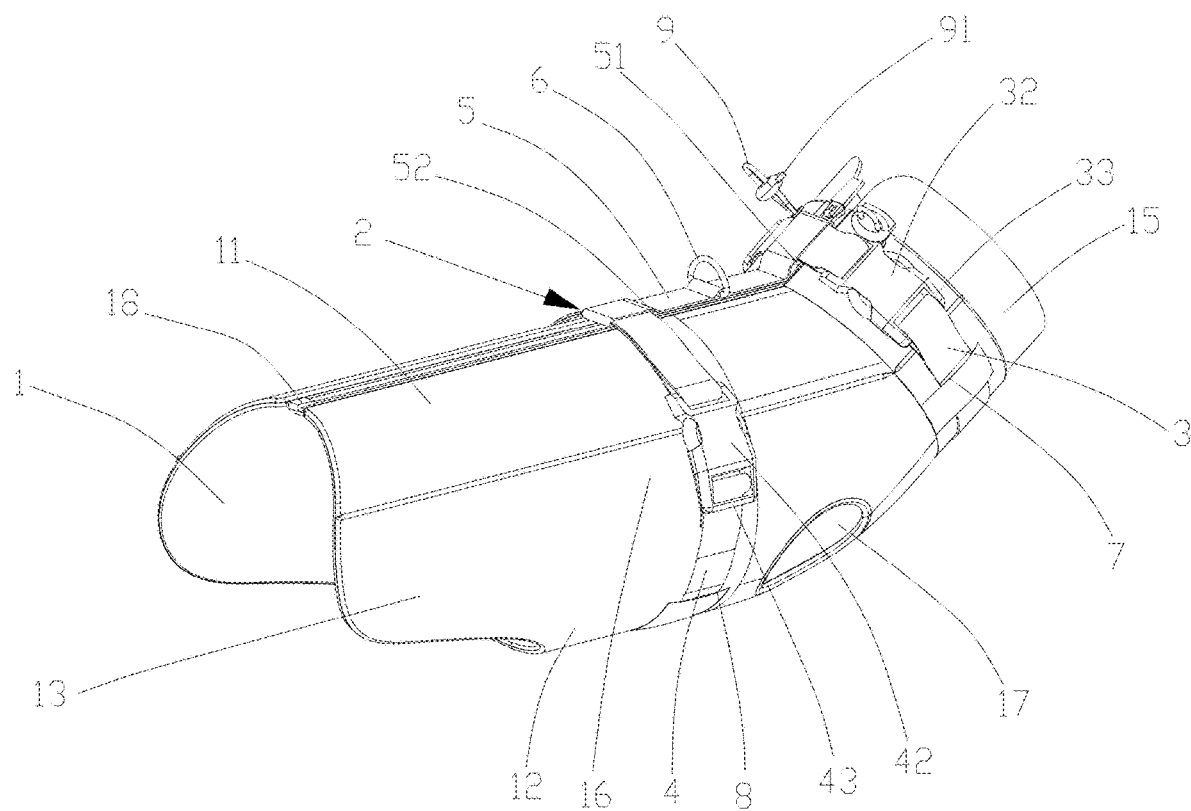
FIG. 1 is a structural schematic diagram illustrating a first side view of a pet garment according to the present disclosure.
Figure 2:
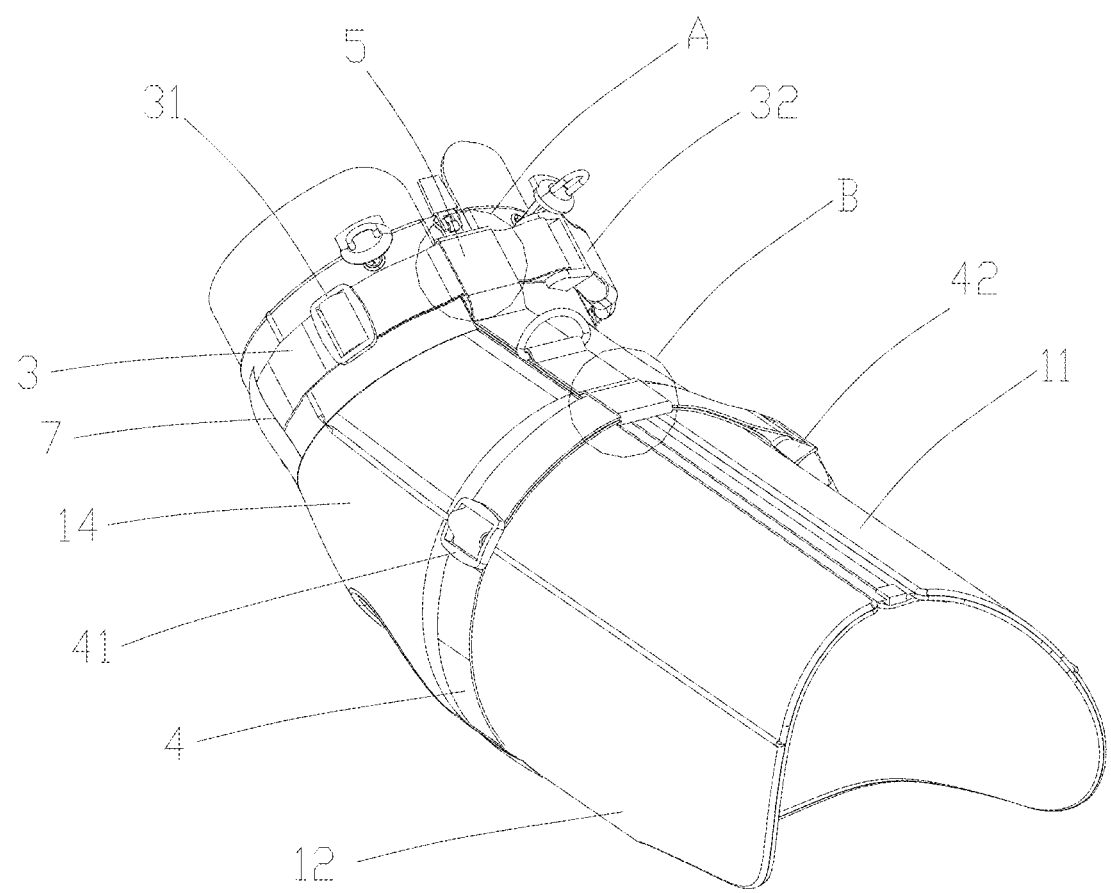
FIG. 2 is a structural schematic diagram illustrating a second side view of the pet garment according to the present disclosure.
Figure 3:
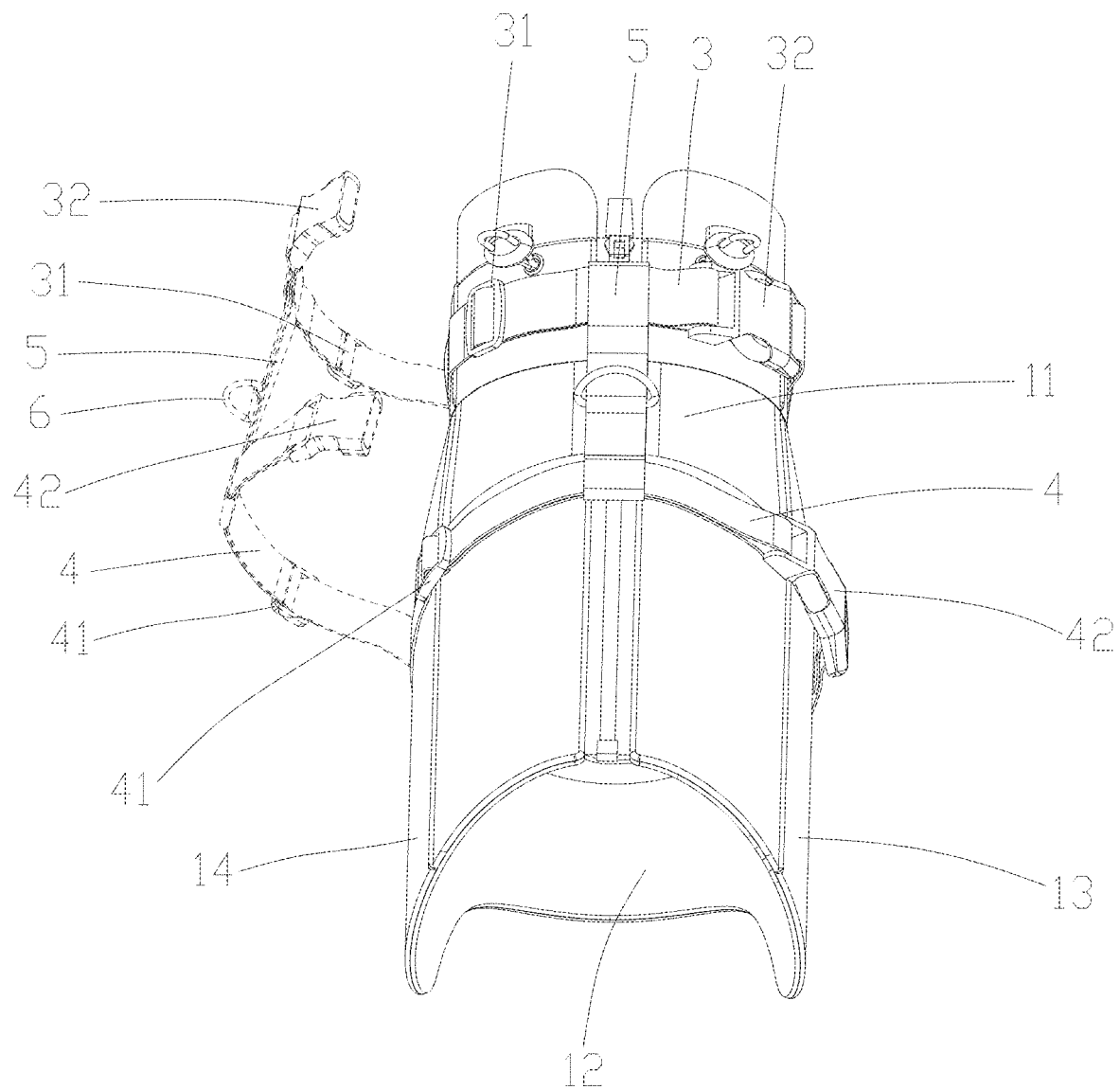
FIG. 3 is an assembly schematic diagram illustrating a top view of the pet garment according to the present disclosure.
Figure 4:
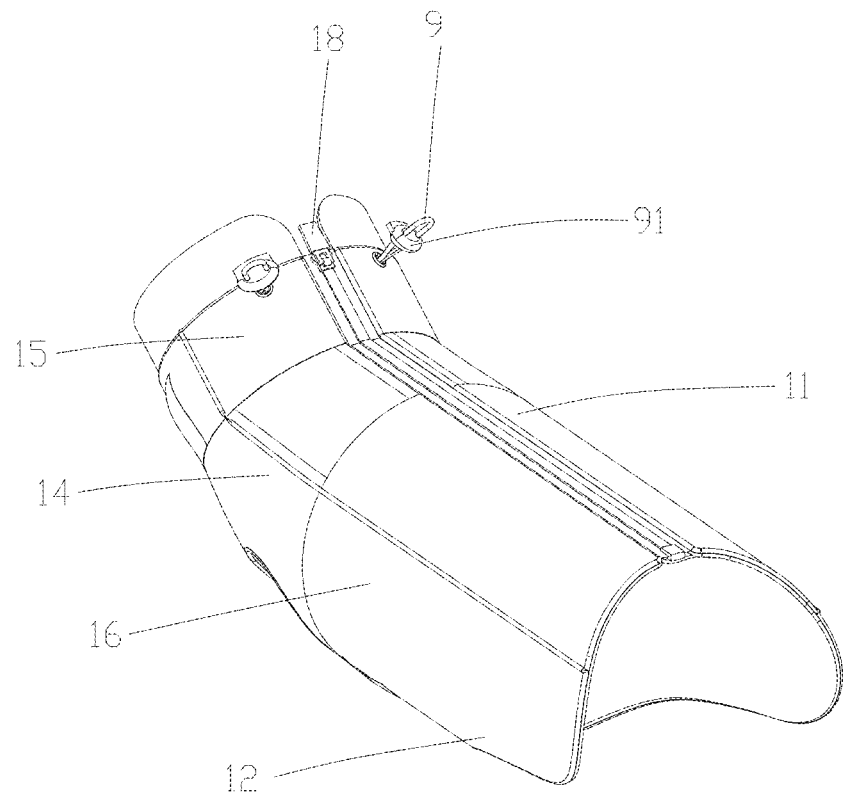
FIG. 4 is a structural schematic diagram of a garment main body shown in FIG. 2.
Figure 5:
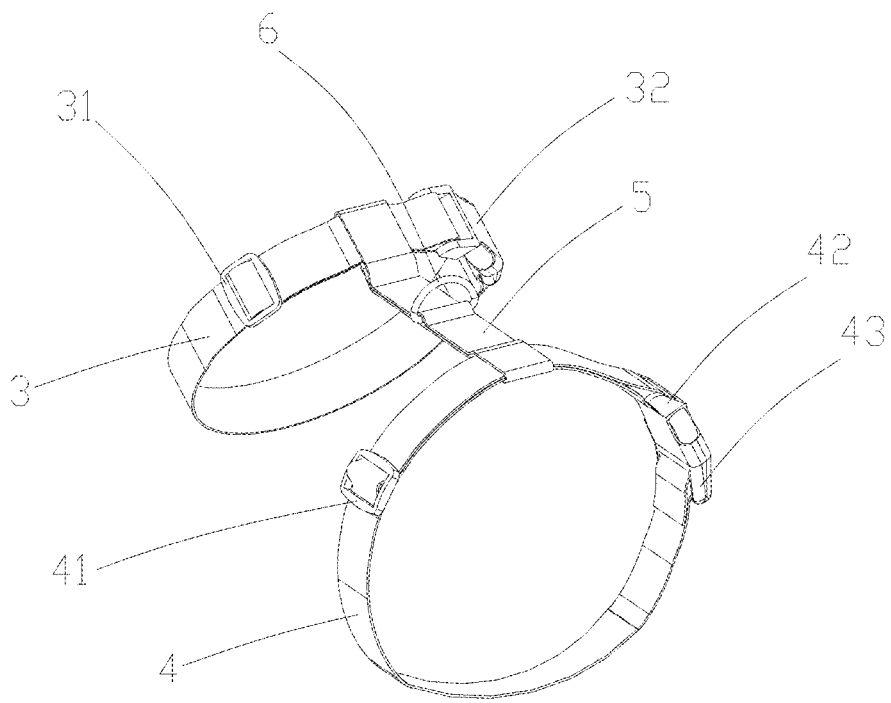
FIG. 5 is a structural schematic diagram of a strap assembly shown in FIG. 2.
Figure 6:
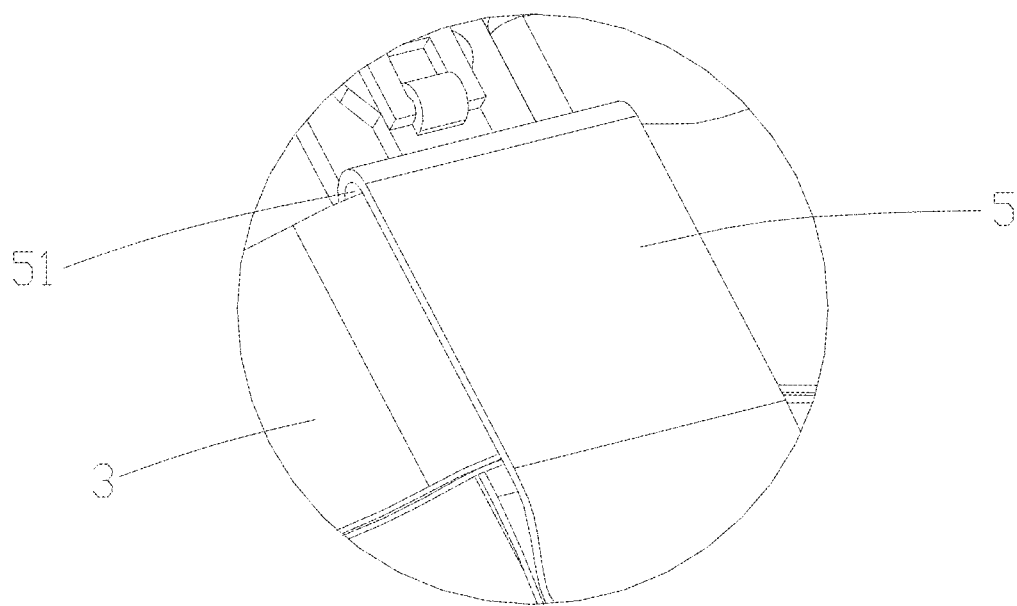
FIG. 6 is an exploded schematic diagram of portion A shown in FIG. 2.
Figure 7:
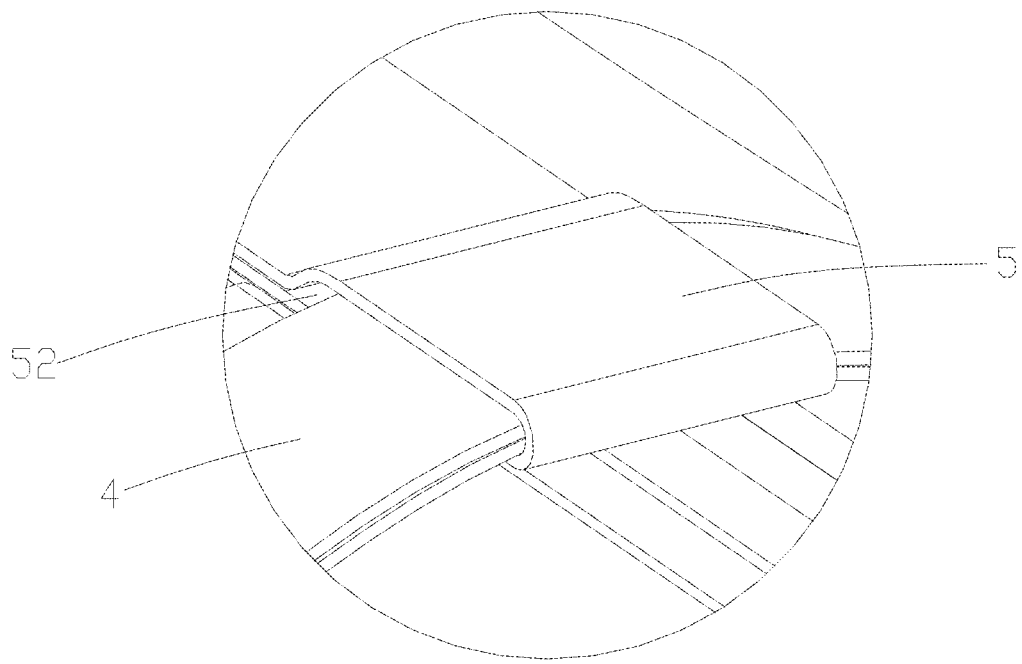
FIG. 7 is a structural schematic diagram of portion B shown in FIG. 2.
Figure 8:
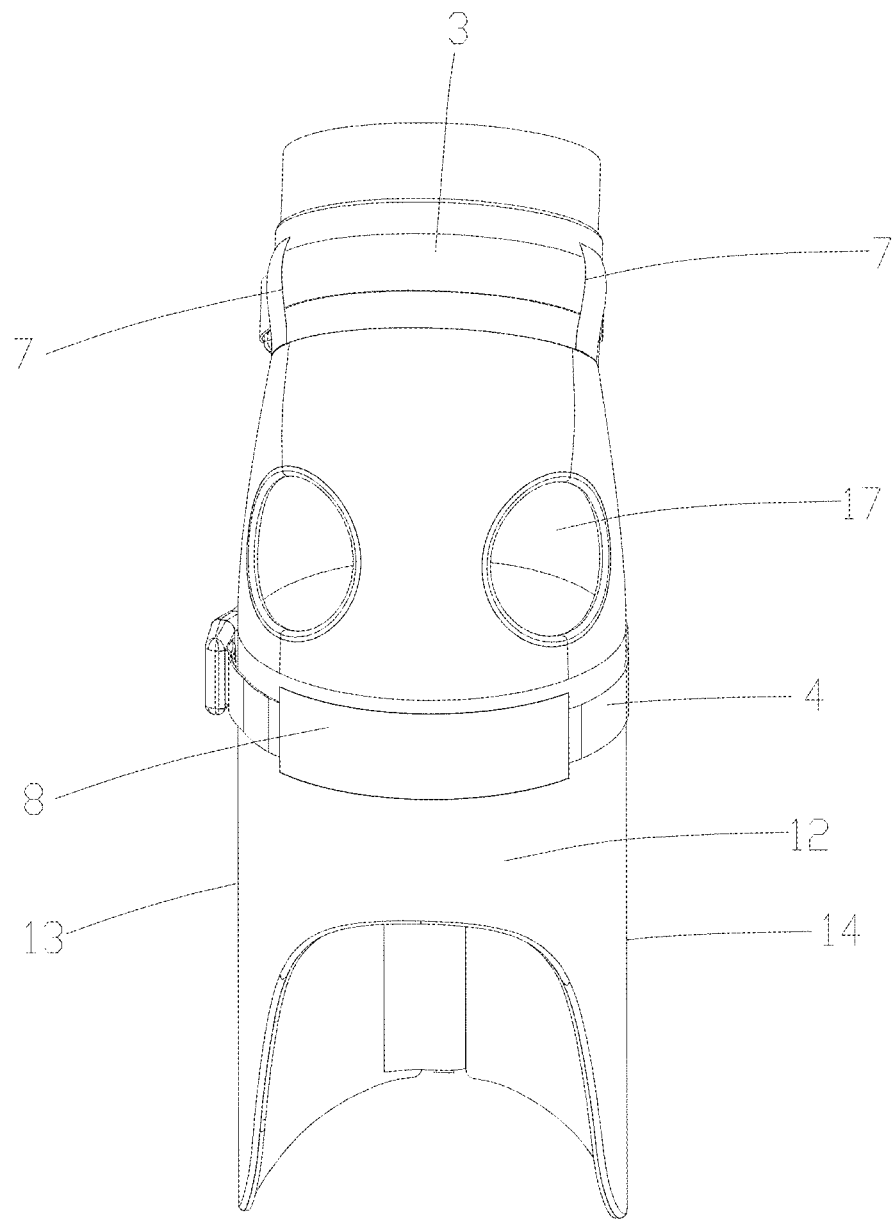
FIG. 8 is a structural schematic diagram illustrating a bottom view of the pet garment according to the present disclosure.

Referring to FIGS. 1-8, the present disclosure provides a per garment, including a garment main body 1 and a strap assembly 2. The garment main body 1 includes a top portion 11, a bottom portion 12, a first side 13, and a second side 14. The strap assembly 2 includes a first strap 3, a second strap 4, and a connecting strap 5. A first end of the first strap 3 and a first end of the second strap 4 are both disposed at the first side 13 of the garment main body 1. The connecting strap 5 is configured to connect a second end of the first strap 3 and a second end of the second strap 4 into a unit. The second end of the first strap 3 and the second end of the second strap 4, along with the connecting strap 5, are routed around the bottom portion 12 of the garment main body 1, over the second side 14 of the garment main body 1, and up to the top portion 11 of the garment main body 1 to position the connecting strap 5 on the top portion of the garment main body 1, the second end of the first strap 3 is detachably connected to the first end of the first strap 3 at the first side 13 of the garment main body 1, the second end of the second strap 4 is detachably connected to the first end of the second strap 4 at the first side 13 of the garment main body 1. A connecting component 6 is disposed on the connecting strap 5, and the connecting component 6 is configured to connect to a pet leash. In some embodiments, the connecting component 6 is a D-shaped buckle.

Based on above, when the pet garment is in use, the garment main body 1 is worn on the pet. Since the second end of the first strap 3 and the second end of the second strap 4, along with the connecting strap 5, are routed around the bottom portion 12 of the garment main body 1, over the second side 14 of the garment main body 1, and up to the top portion 11 of the garment main body 1, the second end of the first strap 3 is detachably connected to the first end of the first strap 3 at the first side 13 of the garment main body 1, and the second end of the second strap 4 is detachably connected to the first end of the second strap 4 at the first side 13 of the garment main body 1, the first strap 3 and the second strap 4 form a restraint around the garment main body. The connecting strap 5 is configured to connect the second end of the first strap 3 and the second end of the second strap 4 into the unit, that is, the first strap 3 and the second strap 4 form a unified restraining assembly. Interaction between the first strap 3 and the second strap 4 creates a coordinated restraining effect, thereby significantly enhancing restraint performance of the pet garment of the present disclosure and further rendering an overall structure of the pet garment more reliable and compact. Additionally, since the connecting strap 5 is positioned at the top portion 11 of the garment main body 1 and the connecting component 6 is disposed on the connecting strap 5, a function of guiding and walking the pet is enabled through connecting the connecting component 6 to the pet leash.

Furthermore, when the pet garment is to be removed from the pet, the second end of the first strap 3 needs to be detached from the first end of the first strap 3, and the second end of the second strap 4 needs to be detached from the first end of the second strap 4. Moreover, after detaching, the connecting strap 5 is capable of connecting the first strap 3 and the second strap 4, which simplifies storage of the first strap 3 and the second strap 4 and preparation for future use.

Specifically, a first end of the connecting strap 5 is connected to the first strap 3, the first end of the connecting strap 5 is connected to the first strap 3 at a point close to the second end of the first strap 3, a second end of the connecting trap 5 is connected to the second strap 4, the second end of the connecting strap 5 is connected to the second strap 4 at a point close to the second end of the second strap 4, so as to connect the second end of the first strap 3 and the second end of the second strap 4 into the unit. The first end of the connecting strap 5 is configured to slide along the first strap 3 at the top portion 11 of the garment main body 1, so as to adjustably connect the first end of the connecting strap 5 to the first strap 3. During a process of walking a pet, if the pet suddenly changes its direction of movement, a resulting pulling force is transmitted through the garment main body 1, the first strap 3, the connecting strap 5, and the pet leash to a person leading the pet. Since the first end of the connecting strap 5 is slidable and adjustable along the first strap 3, a certain degree of cushioning in transmission of the resulting pulling force is allowed, thereby protecting the person leading the pet. Meanwhile, when the person leading the pet experiences the resulting pulling force, the pet inevitably experiences an equal and opposite reaction force, and the equal and opposite reaction force experienced by the pet is also buffered to a certain extent by the pet garment provided in the present disclosure, thereby providing protection for the pet.

Specifically, the connecting strap 5 includes a first limiting sleeve hole 51 at the first end thereof, the first limiting sleeve hole 51 is sleeved on the first strap 3 to allow the first end of the connecting strap 5 to slide along the first strap 3 at the top portion 11 of the garment main body 1, which is simple in structure and convenient in connection. The connecting strap 5 and the first strap 3 are both made of fabric, which ensures that while the first end of the connecting strap 5 slides along the first strap 3 to provide a cushioning effect, there is also sufficient friction between the connecting strap 5 and the first strap 3. Such design prevents unintended relative movement, thereby ensuring stable and reliable traction under normal use conditions.

Furthermore, a first limiting component 131 is disposed at a first side of the first limiting sleeve hole 51, a second limiting component 32 is disposed at a second side of the first limiting sleeve hole 51, the first limiting component 31 and the second limiting component 32 are configured to limit a travel range of the first end of the connecting strap 5 as the first end of the connecting strap 5 slides along the first strap 3, so that the first end of the connecting strap 5 is ensured to remain consistently positioned at the top portion 11 of the garment main body 1.

Furthermore, the first limiting component 31 is a first adjusting buckle, the first adjusting buckle is disposed on the first strap 3 to adjust a length of the first strap 3. The first adjusting buckle is provided to adjust the length of the first strap 3 to accommodate pets of different sizes, thereby enhancing versatility and adaptability of the pet garment. In some embodiments, the first adjusting buckle is a conventional buckle commonly for strap adjustments.

Furthermore, the second limiting component 32 is disposed at the second end of the first strap 3, the second limiting component 32 is a first closure component, a second closure component 33 is disposed at the first end of the first strap 3, the first closure component and the second closure component 33 are detachably connected to detachably connect the second end of the first strap 3 and the first end of the first strap 3, which is simple in structure and convenient in disassembly. In some embodiments, the first closure component and the second closure component 33 are both conventional closure buckles for connecting straps.

Specifically, the second end of the connecting strap 5 is configured to slide along the second strap 4 at the top portion 11 of the garment main body 1, so as to adjustably connect the second end of the connecting strap 5 to the second strap 4. Similarly, during the process of walking the pet, if the pet suddenly changes its direction of movement, a resulting pulling force is transmitted through the garment main body 1, the second strap 3, the connecting strap 5, and the pet leash to the person leading the pet. Since the second end of the connecting strap 5 is slidable and adjustable along the second strap 3, a certain degree of cushioning in transmission of the resulting pulling force is allowed, thereby protecting the person leading the pet. Meanwhile, when the person leading the pet experiences the resulting pulling force, the pet inevitably experiences an equal and opposite reaction force, and the equal and opposite reaction force experienced by the pet is also buffered to a certain extent by the pet garment provided in the present disclosure, thereby providing protection for the pet. In this way, cushioning is achieved at both the first end of the connecting strap 5 and the second end of the connecting strap 5, both the person leading the pet and pet are protected from sudden forces, so as to provide a better protection effect.

Specifically, the connecting strap 5 includes a second limiting sleeve hole 52 at the second end thereof, the second limiting sleeve hole 52 is sleeved on the second strap 4 to allow the second end of the connecting strap 5 to slide along the second strap 4 at the top portion 11 of the garment main body 1, which is simple in structure and convenient in connection. Specifically, the connecting strap 5 and the second strap 4 are both made of fabric, which ensures that while the second end of the connecting strap 5 slides along the second strap 4 to provide a cushioning effect, there is also sufficient friction between the connecting strap 5 and the second strap 4. Such design prevents unintended relative movement, thereby ensuring stable and reliable traction under normal use conditions.

Furthermore, a third limiting component 41 is disposed at a first side of the second limiting sleeve hole 52, a fourth limiting component 42 is disposed at a second side of the second limiting sleeve hole 52, the third limiting component 41 and the fourth limiting component 42 are configured to limit a travel range of the second end of the connecting strap 5 as the second end of the connecting strap 5 slides along the second strap 4, so that the second end of the connecting strap 5 is ensured to remain consistently positioned at the top portion 11 of the garment main body 1.

Furthermore, the third limiting component 41 is a second adjusting buckle, the second adjusting buckle is disposed on the second strap 4 to adjust a length of the second strap 4. The second adjusting buckle is provided to adjust the length of the second strap 4 to accommodate pets of different sizes, thereby enhancing versatility and adaptability of the pet garment. In some embodiments, the second adjusting buckle is a conventional buckle commonly for the strap adjustments.

Furthermore, the fourth limiting component 42 is disposed at the second end of the second strap 4, the fourth limiting component 42 is a third closure component, a fourth closure component 43 is disposed at the first end of the second strap 4, the third closure component and the fourth closure component 43 are detachably connected to detachably connect the second end of the second strap 4 and the first end of the second strap 4, which is simple in structure and convenient in disassembly. In some embodiments, the third closure component and the fourth closure component 43 are both conventional closure buckles for connecting straps.

Furthermore, the garment main body 1 includes a first covering portion 15 and a second covering portion 16. The first covering portion 15 is configured to encircle and cover a neck of the pet, the first end of the first strap 3 is disposed at a first side of the first covering portion 15, the second end of the first strap 3 is routed around a bottom portion of the first covering portion 15, over a second side of the first covering portion 15, up to a top portion of the first covering portion 15, and is detachably connected to the first end of the first strap 3 at the first side of the first covering portion 15. The second covering portion 16 is configured to encircle and cover a chest portion of the pet, the first end of the second strap 4 is disposed at a first side of the second covering portion 16, the second end of the second strap 4 is routed around a bottom portion of the second covering portion 16, over a second side of the second covering portion 16, up to a top portion of the second covering portion 16, and is detachably connected to the first end of the second strap 4 at the first side of the second covering portion 16. Based on above structural design, the first strap 3 is configured to be fitted around the neck of the pet, the second strap 4 is configured to be fitted around the chest portion of the pet, and interaction between the first strap 3, the second strap 4, the connecting strap 5 creates a coordinated restraining effect, thereby significantly enhancing the restraint performance of the pet garment.

Specifically, a first channel 7 is disposed along the bottom portion of the first covering portion 15, extending between the first side of the first covering portion 15 and the second side of the first covering portion 15, the first strap 3 passes through the first channel 7, so as to be attached to the first covering portion 15. A second channel 8 is disposed along the bottom portion of the second covering portion 16, extending between the first side of the second covering portion 16 and the second side of the second covering portion 16, the second strap 4 passes through the second channel 8, so as to be attached to the second covering portion 16. In this way, the strap assembly 2 is attached to the garment main body, which facilitates storage and future use.

Furthermore, the garment main body 1 defines foreleg holes 17 on the bottom portion 12 thereof, the foreleg holes 17 are defined between the first covering portion 15 and the second covering portion 16 for front legs of the pet to pass through, which is simple in structure and convenient in use.

Furthermore, the garment main body 1 includes a zipper 18 on the top portion 11 thereof, so as to detachably connect the first side 13 of the garment main body 1 and the second side 14 of the garment main body 1 at the top portion 11 of the garment main body 1, which facilitates easy wearing and removal of the pet garment on the pet, thereby enhancing convenience and usability of the pet garment.

Furthermore, the first covering portion 15 includes an adjustable cord 9, locking components 91 are respectively disposed at both ends of the adjustable cord 9 for adjusting a size of the first covering portion to fit the pets of different sizes.

Furthermore, the bottom portion 12 of the garment main body 1 does not cover an abdomen of the pet.

The above descriptions provide one or more specific embodiments in conjunction with particular content. These descriptions are not intended to limit specific implementations of the present disclosure to only these examples. Any methods, structures, or designs that are similar, analogous, or derived from an inventive concept disclosed herein, including those resulting from technical derivations or substitutions made within a scope of premise of the present disclosure, shall be considered within a protection scope of the present disclosure.

What is claimed is:
1. A pet garment, comprising:
a garment main body; and
a strap assembly;
   wherein the garment main body comprises a top portion, a bottom portion, a first side, and a second side;
   wherein the strap assembly comprises a first strap, a second strap, and a connecting strap;
   wherein a first end of the first strap and a first end of the second strap are both disposed at the first side of the garment main body;
   wherein the connecting strap is configured to connect a second end of the first strap and a second end of the second strap into a unit;
   wherein the second end of the first strap and the second end of the second strap, along with the connecting strap, are routed around the bottom portion of the garment main body, over the second side of the garment main body, and up to the top portion of the garment main body to position the connecting strap on the top portion of the garment main body, the second end of the first strap is detachably connected to the first end of the first strap at the first side of the garment main body, the second end of the second strap is detachably connected to the first end of the second strap at the first side of the garment main body;
   wherein a connecting component is disposed on the connecting strap, and the connecting component is configured to connect to a pet leash;
   wherein a first end of the connecting strap is connected to the first strap, the first end of the connecting strap is connected to the first strap at a point close to the second end of the first strap, a second end of the connecting trap is connected to the second strap, the second end of the connecting strap is connected to the second strap at a point close to the second end of the second strap, so as to connect the second end of the first strap and the second end of the second strap into the unit.

2. The pet garment according to claim 1, wherein the first end of the connecting strap is configured to slide along the first strap at the top portion of the garment main body, so as to adjustably connect the first end of the connecting strap to the first strap.

3. The pet garment according to claim 2, wherein the connecting strap comprises a first limiting sleeve hole at the first end thereof, the first limiting sleeve hole is sleeved on the first strap to allow the first end of the connecting strap to slide along the first strap at the top portion of the garment main body.

4. The pet garment according to claim 3, wherein a first limiting component is disposed at a first side of the first limiting sleeve hole, a second limiting component is disposed at a second side of the first limiting sleeve hole, the first limiting component and the second limiting component are configured to limit a travel range of the first end of the connecting strap as the first end of the connecting strap slides along the first strap.

5. The pet garment according to claim 4, wherein the first limiting component is a first adjusting buckle, the first adjusting buckle is disposed on the first strap to adjust a length of the first strap.

6. The pet garment according to claim 4, wherein the second limiting component is disposed at the second end of the first strap, the second limiting component is a first closure component, a second closure component is disposed at the first end of the first strap, the first closure component and the second closure component are detachably connected to detachably connect the second end of the first strap and the first end of the first strap.

7. The pet garment according to claim 3, wherein the connecting strap and the first strap are both made of fabric.

8. The pet garment according to claim 1, wherein the second end of the connecting strap is configured to slide along the second strap at the top portion of the garment main body, so as to adjustably connect the second end of the connecting strap to the second strap.

9. The pet garment according to claim 8, wherein the connecting strap comprises a second limiting sleeve hole at the second end thereof, the second limiting sleeve hole is sleeved on the second strap to allow the second end of the connecting strap to slide along the second strap at the top portion of the garment main body.

10. The pet garment according to claim 9, wherein a third limiting component is disposed at a first side of the second limiting sleeve hole, a fourth limiting component is disposed at a second side of the second limiting sleeve hole, the third limiting component and the fourth limiting component are configured to limit a travel range of the second end of the connecting strap as the second end of the connecting strap slides along the second strap.

11. The pet garment according to claim 10, wherein the third limiting component is a second adjusting buckle, the second adjusting buckle is disposed on the second strap to adjust a length of the second strap.

12. The pet garment according to claim 10, wherein the fourth limiting component is disposed at the second end of the second strap, the fourth limiting component is a third closure component, a fourth closure component is disposed at the first end of the second strap, the third closure component and the fourth closure component are detachably connected to detachably connect the second end of the second strap and the first end of the second strap.

13. The pet garment according to claim 7, wherein the connecting strap and the second strap are both made of fabric.

14. A pet garment, comprising:
a garment main body; and
a strap assembly;
wherein the garment main body comprises a top portion, a bottom portion, a first side, and a second side;
wherein the strap assembly comprises a first strap, a second strap, and a connecting strap;
wherein a first end of the first strap and a first end of the second strap are both disposed at the first side of the garment main body;
wherein the connecting strap is configured to connect a second end of the first strap and a second end of the second strap into a unit;
wherein the second end of the first strap and the second end of the second strap, along with the connecting strap, are routed around the bottom portion of the garment main body, over the second side of the garment main body, and up to the top portion of the garment main body to position the connecting strap on the top portion of the garment main body, the second end of the first strap is detachably connected to the first end of the first strap at the first side of the garment main body, the second end of the second strap is detachably connected to the first end of the second strap at the first side of the garment main body;
wherein a connecting component is disposed on the connecting strap, and the connecting component is configured to connect to a pet leash;
wherein the garment main body comprises a first covering portion and a second covering portion;
the first covering portion is configured to encircle and cover a neck of a pet, the first end of the first strap is disposed at a first side of the first covering portion, the second end of the first strap is routed around a bottom portion of the first covering portion, over a second side of the first covering portion, up to a top portion of the first covering portion, and is detachably connected to the first end of the first strap at the first side of the first covering portion; and
the second covering portion is configured to encircle and cover a chest portion of the pet, the first end of the second strap is disposed at a first side of the second covering portion, the second end of the second strap is routed around a bottom portion of the second covering portion, over a second side of the second covering portion, up to a top portion of the second covering portion, and is detachably connected to the first end of the second strap at the first side of the second covering portion.

15. The pet garment according to claim 14, wherein a first channel is disposed along the bottom portion of the first covering portion, extending between the first side of the first covering portion and the second side of the first covering portion, the first strap passes through the first channel, so as to be attached to the first covering portion; and
a second channel is disposed along the bottom portion of the second covering portion, extending between the first side of the second covering portion and the second side of the second covering portion, the second strap passes through the second channel, so as to be attached to the second covering portion.

16. The pet garment according to claim 14, wherein the garment main body defines foreleg holes on the bottom portion thereof, the foreleg holes are defined between the first covering portion and the second covering portion for front legs of a pet to pass through.

17. The pet garment according to claim 16, wherein the garment main body comprises a zipper on the top portion thereof, so as to detachably connect the first side of the garment main body and the second side of the garment main body at the top portion of the garment main body.

18. The pet garment according to claim 14, wherein the first covering portion comprises an adjustable cord, locking components are respectively disposed at both ends of the adjustable cord.

19. The pet garment according to claim 14, wherein the bottom portion of the garment main body does not cover an abdomen of the pet.

* * * * *